United States Patent [19]

Itoh et al.

[11] 4,045,390

[45] Aug. 30, 1977

[54] SILICONE RUBBER COMPOSITIONS

[75] Inventors: Kunio Itoh; Takeshi Fukuda, both of Annaka, Japan

[73] Assignee: Shin-Etsu Chemical Co., Ltd., Japan

[21] Appl. No.: 643,795

[22] Filed: Dec. 23, 1975

[30] Foreign Application Priority Data

Dec. 28, 1974    Japan ..................................... 50-3994

[51] Int. Cl.$^2$ .............................................. C08L 91/00
[52] U.S. Cl. ............................... 260/18 S; 260/37 SB; 260/45.75 R; 260/45.75 P; 260/46.5 UA; 260/46.5 G; 260/825
[58] Field of Search ................. 260/46.5 UA, 46.5 G, 260/825, 375 B, 18 S, 45.75 P, 45.75 R

[56] References Cited

U.S. PATENT DOCUMENTS 3,844,992   10/1974   Antonen ..................... 260/46.5 UA

*Primary Examiner*—Melvyn I. Marquis
*Attorney, Agent, or Firm*—McGlew and Tuttle

[57] ABSTRACT

The organopolysiloxane compositions comprising (a) a linear diorganopolysiloxane having a block structure composed of alternately linked two kinds of blocks of dimethylsiloxane units on one hand and of dimethylsiloxane units and methylvinylsiloxane units on the other hand, (b) a silica filler, (c) a methylhydrogenpolysiloxane as a crosslinking agent, and (d) a platinum catalyst for accelerating crosslinking by addition reaction. Cured silicone rubber elastomers obtained from the composition have very excellent mechanical properties, especially tear strength.

8 Claims, No Drawings

SILICONE RUBBER COMPOSITIONS

FIELD OF THE INVENTION

This invention relates to a novel silicone rubber composition or, in particular, to an organopolysiloxane composition capable of curing into a silicone rubber elastomer having very high tear strength.

DESCRIPTION OF THE PRIOR ART

Silicone rubbers in general are very useful because of their excellent electric properties, heat stability, weathering resistance and several other properties while, on the other hand, conventional silicone rubbers are defective in their rather poor tear strength in comparison with organic synthetic rubbers, such as, polybutadiene rubbers and styrene-butadiene copolymeric rubbers.

OBJECT OF THE INVENTION

It is, therefore, an object of the present invention to present an organopolysiloxane composition capable of giving cured silicone rubber elastomers with very high tear strength.

SUMMARY OF THE INVENTION

The organopolysiloxane composition of the present invention comprises:
(a) 100 parts by weight of a linear diorganopolysiloxane with a polymerization degree higher than 3,000 composed of alternately linked portions of two kinds of blocks, one of which is a diorganopolysiloxane chain of methylvinylsiloxane units $(CH_3)(CH_2=CH)SiO$ and diorganosiloxane units $R_2SiO$, where R is the same or different substituted or unsubstituted monovalent hydrocarbon group having no aliphatic unsaturation, the total number of the methylvinylsiloxane units and the diorganosiloxane units being 10 to 400 and the number of the methylvinylsiloxane units in each of the vinyl-containing blocks being at least 3, and the other of which is a diorganopolysiloxane block of at least 400 of diorganosiloxane units $R_2'SiO$, where R' has the same meaning as R, (b) from 20 to 200 parts by weight of a silica filler with a specific surface area at least 150 m²/g, (c) an organohydrogenpolysiloxane having at least 2 hydrogen atoms directly bonded to the silicon atoms in a molecule in an amount such that the total number of the hydrogen atoms directly bonded to the silicon atoms is equal to from 40% to 400% of the total number of the vinyl groups in the component (a) above, and (d) a catalytic amount of platinum or a platinum compound.

DETAILED DESCRIPTION OF THE INVENTION

The organopolysiloxane composition of the present invention comprising the components (a) to (d) above can be cured into a rubbery elastomer with very high tear strength as well as excellent electric properties, heat stability, weathering resistance and several other properties.

To describe the invention in further detail, the component (a) is, as described above, a linear diorganopolysiloxane with a polymerization degree higher than 3,000 terminated at both chain ends with hydroxy groups directly bonded to the silicon atoms and composed of two kinds of blocks alternately linked to each other. A group of the blocks of which the component (a) is composed consists of vinyl-containing diorganopolysiloxane blocks of methylvinylsiloxane units $(CH_3)(CH_2=CH)SiO$ and diorganosiloxane units $R_2SiO$, where R is the same or different monovalent hydrocarbon group having no aliphatic unsaturation such as methyl, ethyl, propyl, butyl and phenyl, preferably methyl, groups, of which the total number of the methylvinylsiloxane units and the diorganosiloxane units $R_2SiO$ is from 10 to 400 and the number fo the methylvinylsiloxane units in each of the vinyl-containing blocks is at least 3. The remainder of the blocks are the vinyl-free diorganopolysiloxane blocks, each of which is composed of at least 400 of the diorganosiloxane units $R_2'SiO$, where R' has the same meaning as R. It is preferable that the amount of the methylvinylsiloxane units in the component (a) is in the range from 0.05 to 5 mole % of all of the siloxane units.

Further, it is preferable that the number of the blocks in a molecule of the diorganopolysiloxane with block structure is at least 5 and the blocks positioned at the ends of the diorganopolysiloxane with block structure are the vinyl-containing blocks.

The diorganosiloxane units represented by the general formulas $R_2SiO$ and $R_2'SiO$ are exemplified by dimethylsiloxane, diethylsiloxane, di-n-propylsiloxane, methylethylsiloxane, di(chloromethyl)siloxane, methylphenylsiloxane and diphenylsiloxane units.

The linear diorganopolysiloxane with block structure as the component (a) is prepared, for example, by the condensation reactions of dehydrohalogenation, deamination or dehydroximation between a diorganopolysiloxane with a polymerization degree at least 400 terminated at both chain ends with hydroxy groups directly bonded to the silicon atoms, expressed by the general formula

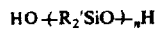

where $n$ is an interger at least 400, and a diorganopolysiloxane terminated at both chain ends with halogen atoms, amino groups or aminoxy groups, respectively, directly bonded to the silicon atoms and composed of methylvinylsiloxane units $(CH_3)(CH_2=CH)SiO$ and diorganosiloxane units $R_2SiO$, where R has the same meaning as defined above, of which the total number of the $(CH_3)(CH_2=CH)SiO$ and $R_2SiO$ units is from 10 to 400 and the number of $(CH_3)(CH_2=CH)SiO$ units in a molecule is at least 3.

When the linear diorganopolysiloxane as the component (a) is employed as terminated at both chain ends with the functional atoms or groups, such as, halogen, amino or aminoxy, directly bonded to the silicon atoms, the resultant silicone rubber elastomers are inferior in various aspects. Therefore it is advisable that such a diorganopolysiloxane is subjected to hydrolysis in order to convert the functional atoms or groups into hydroxy groups.

The silica filler as the component (b) is a conventional one employed in the prior art silicone rubbers, such as, a finely divided silica powder called fumed silica or silica aerogel or hydrogel. The particle size of the silica filler is preferably such that its specific surface area exceeds 150 m²/g as measured by the nitrogen gas adsorption technique, because larger particle size of the silica filler results in unsatisfactory mechanical strengths of the silicone rubber elastomers obtained. The amount of the silica filler to be formulated in the composition is in the range from 20 to 200 parts by weight based on 100 parts by weight of the component (a).

The organohydrogenpolysiloxane as the component (c) having, as mentioned above, at least two hydrogen atoms directly bonded to the silicon atoms may be those prepared by known methods including linear methylhydrogenpolysiloxanes with various polymerization degrees terminated at both chain ends with trimethylsilyl groups or dimethylhydrogensilyl groups, tris(dimethylhydrogensiloxy)-phenylsilane, tetraKis(dimethylhydrogensiloxy)silane, copolymeric siloxanes composed of $SiO_2$ units and $(CH_3)_2HSiO_{0.5}$ units and copolymeric cyclopolysiloxanes composed of methylhydrogensiloxane units and diorganosiloxane units. It is advisable that the organic groups bonded to the silicon atoms to which hydrogen atoms are bonded directly are methyl groups because, when the organic groups are those with relatively large molecular weights, e.g. higher alkyl groups, the curing by the addition reaction between the Si-H groups in the component (c) and the vinyl groups in the component (a) is subject to hindrance by the large organic groups neighboring to the Si-H groups.

The amount of the component (c) to be formulated in the composition is, as mentioned above, in the range such that the number of the Si-H groups in the component (c) is from 40 to 400% of the number of the vinyl groups directly bonded to the silicon atoms in the component (a) in order to obtain curing to a satisfactory extent.

The platinum or platinum compound as the component (d) is essential as a catalyst for accelerating the addition reaction in curing and preferably a soluble platinum compound, such as, chloroplatinic acid and complexes of chloroplatinic acid with olefins, e.g. ethylene, propylene, butadiene and cyclohexene. The platinum catalyst is formulated in a catalytic amount ranging from 0.5 to 20 p.p.m. by weight as platinum based on the total amount of the components (a) and (c).

The silicone rubber composition of the present invention is prepared by blending the components (a) to (d) in a suitable mixing machine, such as, a roller mill, kneader and Banbury mixer. The order with which the individual components are blended successively is not critical but it is a usual practice that the components (a) and (b) are first blended into a uniform mixture and then the components (c) and (d) are added to the mixture and further blended into a composition of the present invention.

The stability of the composition in storing at room temperature is fairly good but it is more advantageous to add a stabilizing agent known in the art, such as, organophosphorus compounds and organic amines, in order to further improve the stability of the composition.

If necessary, it is optional to add various kinds of auxiliary additives to the composition of the present invention including dispersing agents, such as, silane esters and silanols, e.g. methyltriethoxysilane and diphenylsilanediol, heat stability improvers, such as, iron oxide, ceric oxide and iron octoate, and pigments.

It is also optional that several kinds of inorganic fillers, such as, clay, calcium carbonate, diatomaceous earth, titanium dioxide and carbon black, are incorporated into the composition in combination with the silica filler as the component (b).

The curing of the composition of the present invention can be effected by first heating the composition at 100 to 400° C for 30 seconds to 1 hour under pressure or without pressure followed, if necessary, by the secondary heating at 150 to 250° C for 2 to 24 hours to give a cured silicone rubber elastomer with very high tear strength, say, up to 60 kg/cm or higher.

The excellent electric properties, heat stability and weathering resistance of the cured silicone rubber elastomer obtained as above give very wide applicability to the composition of the present invention as various kinds of industrial materials, such as, insulating materials for electric wires, sealing materials, and materials for packings and gaskets especially in the fields where high tear strength is essential for a rubbery material.

Following are the examples to illustrate the present invention in further detail, in which parts are all parts by weight. Examples 1 to 5 are given to describe the procedures for the preparation of the diorganopolysiloxanes as the component (a) terminated at both chain ends with hydroxy groups directly bonded to the silicon atoms. Examples 6 to 8 are for the preparation of similar diorganopolysiloxanes with block structure but outside the range defined for the component (a).

EXAMPLE 1.

Into a mixture of 292.3 parts of octamethylcyclotetrasiloxane, 86.0 parts of tetramethyltetravinylcyclotetrasiloxane and 6.5 parts of dimethyldichlorosilane was dropped 1.3 parts of fuming sulfuric acid, and the mixture was heated first at 30° C for 2 hours and then at 50° C for 20 hours to give a linear diorganopolysiloxane with an average polymerization degree about 100 composed of 20 mole % of methylvinylsiloxane units and 80 mole % of dimethylsiloxane units and terminated at both chain ends with chlorine atoms directly bonded to the silicon atoms.

Into a mixture of 100 parts of a dimethylpolysiloxane with an average polymerization degree about 800 terminated at both chain ends with hydroxy groups directly bonded to the silicon atoms and 3.0 parts of pyridine was dropped 20.8 parts of the chlorine-terminated diorganopolysiloxane obtained above with stirring at room temperature over a period of minutes, during which the condensation reaction of dehydrochlorination took place. After completion of the reaction, the reaction mixture was washed with water and isopropyl alcohol successively into a linear diorganopolysiloxane with an average polymerization degree about 7,000 terminated at both chain ends with hydroxy groups directly bonded to the silicon atoms, corresponding to the formula

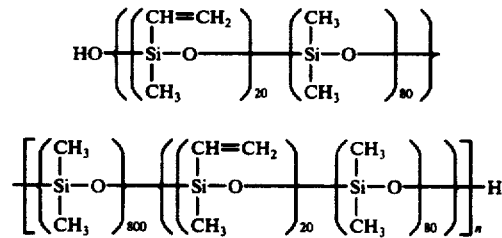

where n is a positive integer of from 6 to 10, composed of alternately linked two kinds of blocks, one of which being diorganopolysiloxane chains with an average polymerization degree 100 formed by methylvinylsiloxane units and dimethylsiloxane units in a mole ratio of the former to the latter units 20/80, and the other of which being dimethylpolysiloxane chains each formed by uninterrupted sequence of 800 in an average of dimethylsiloxane units.

EXAMPLE 2.

By the same procedure as in the preceding example was prepared a linear diorganopolysiloxane with an average polymerization degree 20 terminated at both chain ends with chlorine atoms directly bonded to the silicon atoms, in which the mole ratio of the methylvinylsiloxane units to the dimethylsiloxane units was 50/50.

Into a mixture of 100 parts of a dimethylpolysiloxane with an average polymerization degree about 800 terminated at both chain ends with hydroxy groups directly bonded to the silicon atoms and 1.1 parts of pyridine was dropped 5 parts of the chlorine-terminated diorganopolysiloxane obtained above with stirring at room temperature for 20 minutes, followed by the same post-reaction treatment as in Example 1 to give a hydroxy-terminated diorganopolysiloxane with block structure approximately corresponding to the formula below:

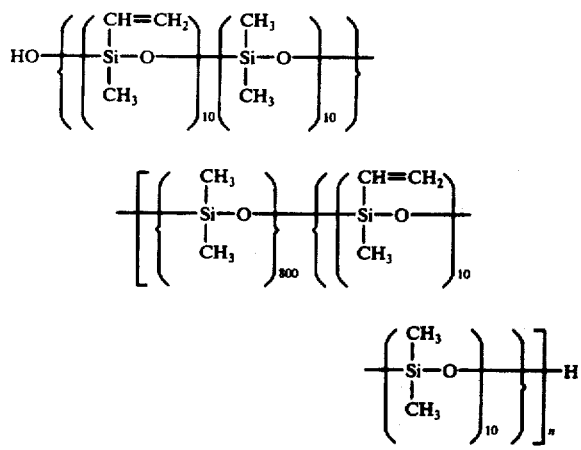

where $n$ is a positive integer of from 6 to 10.

EXAMPLE 3.

By the same procedure as in Example 1 was prepared a diorganopolysiloxane with an average polymerization degree 50 terminated at both chain ends with chlorine atoms directly bonded to the silicon atoms, in which the mole ratio of the methylvinylsiloxane units to the dimethylsiloxane units was 10/90.

Into a mixture of 100 parts of a dimethylpolysiloxane with an average polymerization degree about 800 terminated at both chain ends with hydroxy groups directly bonded to the silicon atoms and 1.5 parts of pyridine was dropped 12.0 parts of the chlorine-terminated diorganopolysiloxane obtained above with stirring at room temperature for 20 minutes, followed by the same post-reaction treatment as in Example 1 to give a hydroxy-terminated diorganopolysiloxane with block structure approximately corresponding to the formula below:

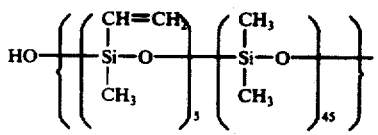

-continued

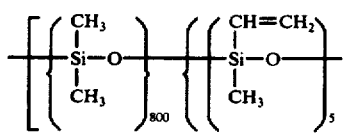

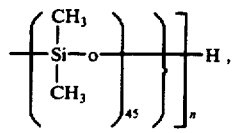

where $n$ is a positive integer of from 6 to 10.

EXAMPLE 4.

A mixture of 281.2 parts of octamethylcyclotetrasiloxane, 86.0 parts of tetramethyltetravinylcyclotetrasiloxane and 18.4 parts of 1,7-bis(dimethylamino)-1,1,3,3,5,5,7,7-octamethyltetrasiloxane expressed by the formula

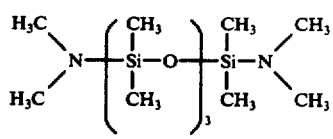

was subjected to an equilibration reaction with addition of 0.2 part of tetramethylammonium hydroxide $(CH_3)_4NOH$ by heating at 120° C for 5 hours to give a linear diorganopolysiloxane with an average polymerization degree 100 terminated at both chain ends with dimethylamino groups directly bonded to the silicon atoms, in which the mole ratio of the methylvinylsiloxane units to the dimethylsiloxane units was 20/80.

Into 100 parts of a dimethylpolysiloxane with an average polymerization degree about 800 terminated at both chain ends with hydroxy groups directly bonded to the silicon atoms was dropped 15.7 parts of the dimethylamino-terminated diorganopolysiloxane obtained above with stirring at 80° C over a period of 3 hours, during which the condensation reaction of deamination took place, followed by washing with water and isopropyl alcohol successively to give a diorganopolysiloxane with block structure approximately corresponding to the formula below:

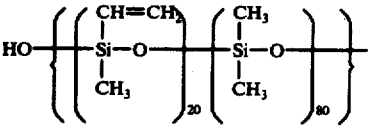

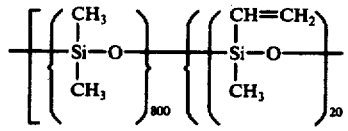

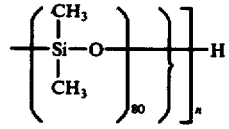

where $n$ is a positive integer of from 6 to 10.

EXAMPLE 5.

Into a mixture of 100 parts of a diorganopolysiloxane with an average polymerization degree about 1,200 terminated at both chain ends with hydroxy groups directly bonded to the silicon atoms and 2.0 parts of pyridine was dropped 16.0 parts of the chlorine-terminated diorganopolysiloxane with an average polymerization degree 100 prepared in Example 1 with stirring at room temperature over a period of 20 minutes, followed by a similar post-reaction treatment as in Example 1 to give a linear diorganopolysiloxane with block structure approximately corresponding to the formula below:

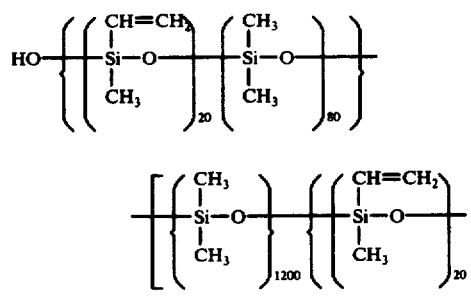

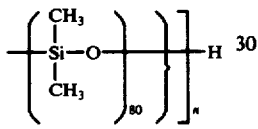

where $n$ is a positive integer from 5 to 8.

EXAMPLE 6.

In a similar procedure as in Example 1 was prepared a linear diorganopolysiloxane with an average polymerization degree 100 terminated at both chain ends with chlorine atoms directly bonded to the silicon atoms, in which the molar ratio of the methylvinylsiloxane units to the dimethylsiloxane units was 2/98.

Into a mixture of 100 parts of a dimethylpolysiloxane with an average polymerization degree about 800 terminated at both chain ends with hydroxy groups directly bonded to the silicon atoms and 3.0 parts of pyridine was dropped 20.0 parts of the chlorine-terminated diorganopolysiloxane prepared above with stirring at room temperature for 20 minutes, followed by a similar post-reaction treatment as in Example 1 to give a linear diorganopolysiloxane with block structure corresponding approximately to the formula below:

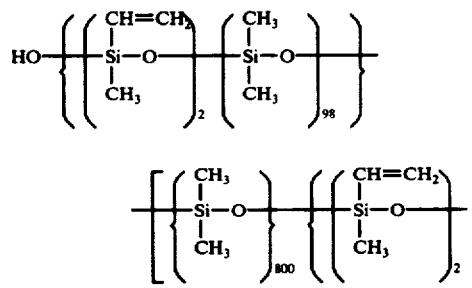

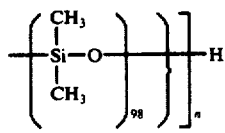

where $n$ is a positive integer of from 6 to 10.

EXAMPLE 7.

By the same procedure as in Example 1 was prepared a diorganopolysiloxane with an average polymerization degree 100 terminated at both chain ends with chlorine atoms directly bonded to the silicon atoms, in which the mole ratio of the methylvinylsiloxane units to the dimethylsiloxane units was 9/95.

Into a mixture of 100 parts of a dimethylpolysiloxane with an average polymerization degree about 50 terminated at both chain ends with hydroxy groups directly bonded to the silicon atoms and 20 parts of pyridine was dropped 24.0 parts of the chlorine-terminated diorganopolysiloxane obtained above with stirring at room temperature for 20 minutes, followed by the same post-reaction treatment as in Example 1 to give a hydroxy-terminated diorganopolysiloxane with block structure corresponding approximately to the formula below:

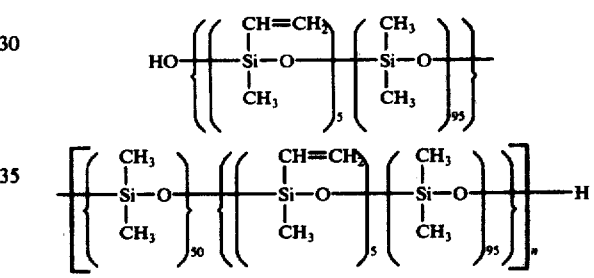

where $n$ is a positive integer of from 30 to 40.

EXAMPLE 8.

Into a mixture of 100 parts of a dimethylpolysiloxane with an average polymerization degree about 1,200 terminated at both chain ends with hydroxy groups directly bonded to the silicon atoms and 6.0 parts of pyridine was dropped 40.0 parts of the diorganopolysiloxane with an average polymerization degree 100 obtained in Example 1 with stirring at room temperature for 20 minutes, followed by the same post-reaction treatment as in Example 1 to give a hydroxy-terminated diorganopolysiloxane with block structure corresponding approximately to the formula below:

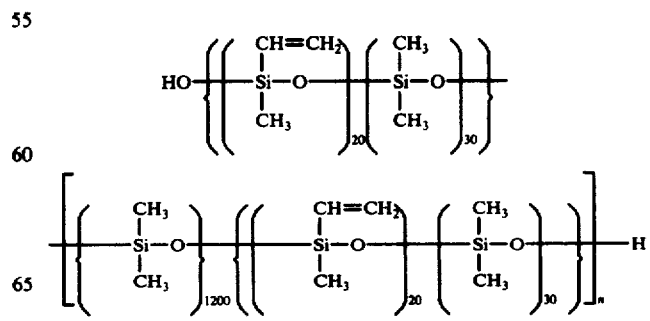

where $n$ is an integer of from 1 to 2.

EXAMPLE 9.

100 parts of the hydroxy-terminated diorganopolysiloxane with block structure prepared in Example 1, 50 parts of a fumed silica with a specific surface area 300 m²/g, 3 parts of diphenylsilanediol and 7 parts of a hydroxy-terminated linear dimethylpolysiloxane with a viscosity 20 centistokes at 25° C were uniformly blended by a roller mill, followed by a heat treatment of the mixture at 180° C for 4 hours. Into the mixture thus obtained were added a methylhydrogenpolysiloxane expressed by the formula

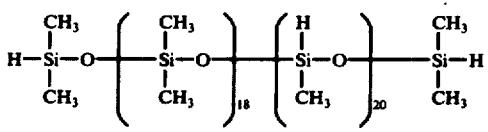

in an amount shown below in Table 1 and chloroplatinic acid in an amount of 15 p.p.m. by weight as platinum based on the total amount of the hydroxy-terminated diorganopolysiloxane and methylhydrogenpolysiloxane.

The compositions obtained above were fabricated into cured silicone rubber sheets 2 mm thick by press-curing at 170° C for 10 minutes under a pressure of 30 kg/cm² followed by secondary heating at 200° C for 4 hours. The properties of these silicone rubber sheets are shown in Table I.

Table I

| Experiment No. | 1 | 2 | 3 |
|---|---|---|---|
| Amount of methylhydrogenpolysiloxane, parts | 1.6 | 2.8 | 4.4 |
| Hardness (JIS C 2123) | 54 | 62 | 68 |
| Elongation (at break), % | 560 | 465 | 370 |
| Tensile strength, kg/cm² | 88 | 85 | 83 |
| Tear strength, kg/cm | 48 | 50 | 56 |
| Modulus at 100 % elongation, kg/cm² | 26 | 32 | 40 |
| Modulus at 200 % elongation, kg/cm² | 40 | 45 | 65 |

EXAMPLE 10.

A silicone rubber sheet 2 mm thick was obtained in the same manner as in the preceding example except that the diorganopolysiloxane with block structure prepared in Example 2 was employed instead of the diorganopolysiloxane prepared in Example 1. The amount of the methylhydrogenpolysiloxane here was 2.8 parts. The properties of the cured silicone rubber sheet thus obtained were: hardness (JIS C 2123) 54; elongation (at break) 530 %; tensile strength 83 kg/cm²; and tear strength 35 kg/cm.

EXAMPLE 11.

A cured silicone rubber sheet 2 mm thick was obtained in the same manner as in the preceding example except that the diorganopolysiloxane with block structure employed here was that which was prepared in Example 3 instead of Example 2. The properties of the sheet were: hardness (JIS C 2123) 60; elongation (at break) 420%; tensile strength 92 kg/cm²; and tear strength 46 kg/cm.

EXAMPLE 12.

A cured silicone rubber sheet 2 mm thick was obtained in the same manner as in the preceding example except that the diorganopolysiloxane with block structure employed here was that which was prepared in Example 4 instead of Example 3. The properties of the sheet were: hardness (JIS C 2123) 68; elongation (at break) 320%; tensile strength 86 kg/cm²; tear strength 47 kg/cm; modulus at 100% elongation 40 kg/cm²; and modulus at 200% elongation 65 kg/cm².

EXAMPLE 13.

Cured silicone rubber sheets each 2 mm thick were obtained just in the same manner as in Example 9 except that the diorganopolysiloxane with block structure employed here was that which was prepared in Example 5 instead of Example 1 and the amount of methylhydrogenpolysiloxane was varied as shown in Table II. The properties of the sheets are given in the same table.

Table II

| Experiment No. | 4 | 5 | 6 |
|---|---|---|---|
| Amount of methylpolysiloxane, parts | 2.5 | 3.7 | 5.0 |
| Hardness (JIS C 2123) | 62 | 68 | 72 |
| Elongation (at break), % | 460 | 350 | 260 |
| Tensile strength, kg/cm² | 90 | 86 | 80 |
| Tear strength, kg/cm | 53 | 52 | 56 |
| Modulus at 100 % elongation, kg/cm² | 41 | 51 | 58 |
| Modulus at 200 % elongation, kg/cm² | 55 | 62 | 67 |

EXAMPLE 14.

Cured silicone rubber sheets each 2 mm thick were obtained in the same manner as in Example 13 except that the various organohydrogen polysiloxanes were used instead of the methylhydrogenpolysiloxane in varied amounts as shown in Table III. The properties of the sheets are shown in the same table.

Table III

| Experiment No. | 7 | 8 | 9 | 10 | 11 |
|---|---|---|---|---|---|
| Kind of organohydrogenpolysiloxane | (A)* | (B)* | (B)* | (B)* | (C)* |
| Amount of organohydrogenpolysiloxane, parts | 8.0 | 1.9 | 2.7 | 3.5 | 3.2 |
| Hardness (JIS C 2123) | 54 | 64 | 62 | 58 | 64 |
| Elongation (at break), % | 620 | 465 | 520 | 550 | 540 |
| Tensile strength, kg/cm² | 80 | 95 | 102 | 100 | 92 |
| Tear strength, kg/cm | 35 | 48 | 51 | 51 | 47 |

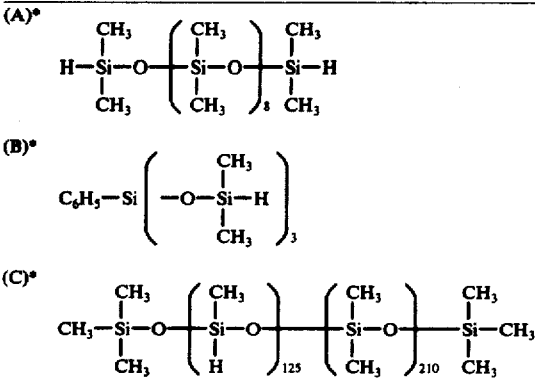

Control 1.

A cured silicone rubber sheet of 2 mm thick was obtained in the same manner as in Example 1 except that the diorganopolysiloxane with block structure employed here was that which was prepared in Example 6 instead of Example 1 and the amount of the methylhydrogenpolysiloxane was decreased to 0.5 parts. The properties of the sheet were: hardness (JIS C 2123) 56; elongation (at break) 650%; tensile strength 95 kg/cm²; and tear strength 22 kg/cm.

Control 2.

A cured silicone rubber sheet of 2 mm thickness was obtained in the same manner as in Example 1 except that the diorganopolysiloxane with block structure prepared in Example 1 was replaced by a diorganopolysiloxane with an average polymerization degree about 8,000 terminated at both chain ends with trimethylsilyl groups and composed of 99.5 mole % of dimethylsiloxane units and 0.5 mole % of methylvinylsiloxane units randomly linked together and the amount of the methylhydrogenpolysiloxane was increased to 1.0 part. The properties of the sheet were: hardness (JIS C 2123) 60; elongation (at break) 450%; tensile strength 90 kg/cm$^2$; and tear strength 20 kg/cm.

Control 3.

Cured silicone rubber sheets each 2 mm thick were obtained in the same manner as in Example 9 except that the diorganopolysiloxane with block structure employed here was that which was prepared in Example 7 instead of Example 1 and the amount of the methylhydrogenpolysiloxane was 8.0 or 12.0 parts. The properties of the sheets were found as follows.

| Amount of methylhydrogen-polysiloxane, parts | 12.0 | 8.0 |
|---|---|---|
| Hardness (JIS C 2123) | 76 | 70 |
| Elongation (at break), % | 55 | 120 |
| Tensile strength, kg/cm$^2$ | 45 | 56 |
| Tear strength, kg/cm | 7 | 9 |

Control 4.

A cured silicone rubber sheet 2 mm thick was obtained in the same manner as in Example 9 except that the diorganopolysiloxane with block structure employed here was that which was prepared in Example 8 instead of Example 1 and the amount of the methylhydrogenpolysiloxane was 2.5 parts. The properties of the sheet were found as follows.

| Hardness (JIS C 2123) | 58 |
|---|---|
| Elongation (at break), % | 250 |
| Tensile strength, kg/cm$^2$ | 62 |
| Tear strength, kg/cm | 14 |

What we claim is:

1. An organopolysiloxane composition comprising (a) 100 parts by weight of a linear diorganopolysiloxane with a polymerization degree higher than 3,000 terminated at both chain ends with hydroxy groups directly bonded to the silicon atoms and composed of alternately linked portions of two kinds of blocks, (i) one of which is a vinyl-containing diorganopolysiloxane block composed of randomly linked methylvinylsiloxane units (CH$_3$) (CH$_2$=CH)SiO and diorganosiloxane units R$_2$SiO, where R is the same or different substituted or unsubstituted monovalent hydrocarbon group having no aliphatic unsaturation, the total number of said methylvinylsiloxane units and said diorganosiloxane units being from 10 to 400 and the number of said methylvinylsiloxane units in each of the vinyl-containing blocks being at least 3, and (ii) the other of which is a vinyl-free diorganopolysiloxane block composed of at least 400 of diorganosiloxane units R$_2$'SiO where R' has the same meaning as R above, (b) from about 20 to about 200 parts by weight of a silica filler with a specific surface area at least 150 m$^2$/g, (c) an organohydrogenpolysiloxane having at least two hydrogen atoms directly bonded to the silicon atoms in a molecule in an amount such that the total number of the hydrogen atoms directly bonded to the silicon atoms is equal to from about 40% to about 400% of the total number of the vinyl groups in the said component (a) defined above, and (d) a catalytic amount of platinum or a platinum compound.

2. The organopolysiloxane composition according to claim 1, wherein said monovalent hydrocarbon group R and R' are each selected from the class consisting of methyl, ethyl, propyl, butyl, and phenyl groups.

3. The organopolysiloxane composition according to claim 1, wherein from 0.05 to 5 mole % of the siloxane units in said component (a) are methylvinylsiloxane units.

4. The organopolysiloxane composition according to claim 1, wherein said silica filler is a fumed silica.

5. The organopolysiloxane composition according to claim 1, wherein the organic groups bonded to the silicon atoms in said component (c) to which the hydrogen atoms are directly bonded are methyl groups.

6. The organopolysiloxane composition according to claim 1, wherein said platinum compound is chloroplatinic acid.

7. The organopolysiloxane composition according to claim 1, wherein said component (d) is present in an amount ranging from 0.5 p.p.m. to 20 p.p.m. by weight as platinum based on the total amount of said components (a) and (c).

8. The organopolysiloxane composition according to claim 1, wherein at least one additional component is added to said composition, said component being selected from the class consisting of an organophosphorous compound or an organic amine stabilizing agent, an ester silane or silanol dispersing agent, an iron or ceric oxide, or iron octoate heat stability improver, and pigments.

* * * * *